(12) United States Patent
Hioki et al.

(10) Patent No.: US 11,135,671 B2
(45) Date of Patent: Oct. 5, 2021

(54) RESISTANCE SPOT WELDING METHOD

(71) Applicant: TOYOTA JIDOSHA KABUSHIKI KAISHA, Toyota (JP)

(72) Inventors: Toru Hioki, Miyoshi (JP); Shuhei Ogura, Nagakute (JP); Atsushi Kawakita, Miyoshi (JP); Yoichi Tsutsumi, Toyota (JP); Takashi Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 258 days.

(21) Appl. No.: 16/250,012

(22) Filed: Jan. 17, 2019

(65) Prior Publication Data
US 2019/0247948 A1    Aug. 15, 2019

(30) Foreign Application Priority Data

Feb. 13, 2018 (JP) .............................. JP2018-022902

(51) Int. Cl.
*B23K 11/10* (2006.01)
*B23K 11/11* (2006.01)
*B23K 11/24* (2006.01)

(52) U.S. Cl.
CPC ........... *B23K 11/115* (2013.01); *B23K 11/241* (2013.01)

(58) Field of Classification Search
CPC ........ B23K 11/3009; B23K 11/11–115; B23K 11/314–318; B23K 11/10–11; B23K 11/362–364
See application file for complete search history.

(56) References Cited

U.S. PATENT DOCUMENTS 4,678,887 A * 7/1987 Nagel .................. B23K 11/252
219/110
5,582,747 A * 12/1996 Sakai .................. B23K 11/253
219/86.41
(Continued)

FOREIGN PATENT DOCUMENTS

| CN | 104349969 A | 2/2015 |
| CN | 104661784 A | 5/2015 |

(Continued)

OTHER PUBLICATIONS

Partial Translation of Communication dated Apr. 14, 2021 from the China National Intellectual Property Administration in Application No. 201910097999.9.
(Continued)

*Primary Examiner* — Michael A Laflame, Jr.
(74) *Attorney, Agent, or Firm* — Sughrue Mion, PLLC

(57) ABSTRACT

A resistance spot welding method includes sandwiching metal plates put on top of one another between a pair of electrodes and performing resistance spot welding sequentially on a plurality of welding points close to each other on the metal plates by performing a current application between the electrodes so as to join the metal plates to each other. A welding current value to form a welding nugget at a welding point to be subjected to the resistance spot welding second or later among the welding points is set to be higher than a first welding current value to form a first welding nugget at a first welding point to be subjected to the resistance spot welding first among the welding points.

10 Claims, 6 Drawing Sheets

(56) References Cited

U.S. PATENT DOCUMENTS

| | | | | |
|---|---|---|---|---|
| 5,906,755 | A * | 5/1999 | Arasuna | B23K 11/311 219/86.41 |
| 8,076,604 | B2 * | 12/2011 | Rippl | B23K 11/115 219/91.2 |
| 2010/0243616 | A1 * | 9/2010 | Goto | B23K 11/30 219/117.1 |
| 2011/0089146 | A1 * | 4/2011 | Takahashi | B23K 11/115 219/91.2 |
| 2011/0180518 | A1 * | 7/2011 | Hasegawa | B23K 11/115 219/108 |
| 2011/0272384 | A1 * | 11/2011 | Matsushita | B23K 11/115 219/91.2 |
| 2014/0305912 | A1 * | 10/2014 | Taniguchi | B23K 11/115 219/91.22 |
| 2015/0053655 | A1 * | 2/2015 | Sigler | B23K 11/115 219/91.22 |
| 2015/0166117 | A1 | 6/2015 | Ohoka et al. | |
| 2015/0174690 | A1 * | 6/2015 | Furusako | B23K 11/115 219/91.22 |
| 2015/0336212 | A1 | 11/2015 | Hisada et al. | |
| 2016/0144451 | A1 * | 5/2016 | Fujimoto | B23K 11/115 219/92 |
| 2016/0288262 | A1 | 10/2016 | Hisada et al. | |
| 2017/0072502 | A1 * | 3/2017 | Karagoulis | B23K 11/115 |
| 2017/0080515 | A1 * | 3/2017 | Furusako | B23K 11/115 |
| 2018/0099357 | A1 | 4/2018 | Hisada et al. | |

FOREIGN PATENT DOCUMENTS

| | | |
|---|---|---|
| CN | 106425070 A | 2/2017 |
| JP | 2012-187621 A | 10/2012 |
| JP | 2016-196015 A | 11/2016 |
| WO | 2014/045431 A1 | 3/2014 |

OTHER PUBLICATIONS

"Welding Handbook: Welding Method and Equipment", Welding Institution of Chinese Mechanical Engineering Society (Second Edition), Mechanical Industry Press, (Third Edition), Mar. 2016, p. 395 (3 pages total).

* cited by examiner

RESISTANCE SPOT WELDING METHOD

INCORPORATION BY REFERENCE

The disclosure of Japanese Patent Application No. 2018-022902 filed on Feb. 13, 2018 including the specification, drawings and abstract is incorporated herein by reference in its entirety.

BACKGROUND

1. Technical Field

The disclosure relates to a resistance spot welding method. Particularly, the disclosure relates to measures to increase the joining strength of a welded portion.

2. Description of Related Art

There has been conventionally known resistance spot welding as welding applied to joining between a plurality of metal plates (welded materials). In order to increase the joining strength of a welded portion between the metal plates, it is effective to enlarge a welding nugget diameter provided by the resistance spot welding.

However, in the resistance spot welding in the related art, there is a limit to a welding nugget diameter that can be formed by a tip diameter of an electrode in a welding device. Further, when a welding current value is set to be drastically high, it is possible to obtain a welding nugget diameter larger than the tip diameter of the electrode. However, in this case, there is a concern about occurrence of expulsion and surface flash (dispersion of molten metal) in a joining portion between the metal plates. Further, in a case where the tip diameter of the electrode is made large, it is necessary to increase a pressure (welding pressure) to the metal plates. This requires upsizing of the welding device and is not practical.

In Japanese Unexamined Patent Application Publication No. 2016-196015 (JP 2016-196015 A), in a state where metal plates are temporarily fastened by resistance spot welding, they are joined by laser spot welding at a plurality of points around this temporarily fastened part. That is, the joining strength of a welded portion is increased by forming a plurality of welding nuggets in a close manner within a predetermined range.

SUMMARY

The technique described in JP 2016-196015 A requires two types of welding, i.e., resistance spot welding and laser spot welding, so that individual welding devices to perform the two types of welding are required. On this account, a welding method to increase the joining strength of a welded portion by forming a plurality of welding nuggets in a close manner within a predetermined range only by resistance spot welding is desired.

The inventors of the disclosure studied about forming of a plurality of welding nuggets in a close manner within a predetermined range only by the resistance spot welding. The inventors focused on the following point. That is, the resistance spot welding might cause splitting (dispersion) of a welding current due to welding points being close to each other, and if adverse effects (insufficiency in welding nugget diameter, and the like) due to the splitting of the welding current cannot be restrained, it is difficult to form a plurality of welding nuggets with a target nugget diameter in a close manner within a predetermined range only by the resistance spot welding.

Then, the inventors of the disclosure newly found that the above problem can be solved by appropriately setting a welding current value in resistance spot welding.

The disclosure provides a resistance spot welding method by which a plurality of welding nuggets with a target nugget diameter can be formed in a close manner within a predetermined range only by resistance spot welding.

A first aspect of the disclosure relates to a resistance spot welding method. The resistance spot welding method includes sandwiching a plurality of metal plates put on top of one another between a pair of electrodes and performing resistance spot welding sequentially on a plurality of welding points close to each other on the metal plates by performing a current application between the electrodes, so as to join the metal plates. A welding current value to form a welding nugget at a welding point to be subjected to the resistance spot welding second or later among the welding points is set to be higher than a first welding current value to form a first welding nugget at a first welding point to be subjected to the resistance spot welding first among the welding points.

Note that "close to each other" as used herein indicates a state where the welding points are close to each other to such an extent that there is a concern about occurrence of splitting of a welding current, in a case where resistance spot welding is sequentially performed on the welding points.

Due to the specified matter, when the welding nugget (first welding nugget) is formed at the welding point (first welding point) subjected to the resistance spot welding first among the welding points close to each other on the metal plates, a welding current is not split. Accordingly, it is not necessary to consider the splitting of the welding current, and therefore, the welding current value (first welding current value) at this time should be set to a value to form a welding nugget with a target nugget diameter. On the other hand, at the time when a welding nugget is formed at a welding point subjected to the resistance spot welding second or later among the welding points close to each other on the metal plates, the welding current is highly likely to be split. On this account, the welding current value at this time is set to be higher than the above welding current value (the first welding current value to form the welding nugget at the welding point subjected to the resistance spot welding first) in consideration of the splitting of the welding current, so that the welding nugget with the target nugget diameter can be formed even if the welding current is split. Hereby, it is possible to form the welding nugget with the target nugget diameter even at the welding point subjected to the resistance spot welding second or later, thereby restraining adverse effects (insufficiency in welding nugget diameter, and the like) caused due to the splitting of the welding current. As a result, it is possible to form the welding nuggets with the target nugget diameter in a close manner within a predetermined range only by the resistance spot welding. This makes it possible to increase the joining strength of a welded portion without causing upsizing of a welding device.

The resistance spot welding method of the first aspect may further include performing a preliminary current application on the welding points prior to applying a welding current to the welding points so as to form the first welding nugget and the welding nugget. A current value in the preliminary current application may be a value lower than the first welding current value and the welding current value, and the same current value may be set for the welding points as the current value in the preliminary current application.

With the configuration, the metal plates are heated by the preliminary current application performed prior to application of the welding current to form a welding nugget, and along with softening of the metal plates, a gap between the metal plates can be almost eliminated. As a result, it is possible to restrain expulsion and surface flash that easily occurs at the time when spot welding (a current application of the welding current to form a welding nugget) is performed in a state where a contact area between the metal plates is small, thereby making it possible to increase reliability to form the welding nugget with the target nugget diameter.

In the first aspect, the welding current value may be set to a value higher by 10% to 50% than the first welding current value.

Even with this configuration, it is possible to sufficiently secure a welding nugget diameter at the welding point subjected to the resistance spot welding second or later, thereby making it possible to increase reliability to appropriately form the welding nuggets with the target nugget diameter at respective welding points.

In the first aspect, as a distance between the welding points is shorter, a ratio of the welding current value to the first welding current value may be set to be higher.

As the distance between the welding points are shorter, the welding current is highly likely to be split at the time of welding performed on the welding point subjected to the resistance spot welding second or later, so that its splitting ratio easily increases. On this account, in order to form the welding nugget with the target nugget diameter even if the welding current is split, the ratio of the welding current value to form the welding nugget at the welding point subjected to the resistance spot welding second or later is set to be higher as the distance between the welding points is shorter. Hereby, regardless of the distance between the welding points, it is possible to form the welding nugget with the target nugget diameter even at the welding point subjected to the resistance spot welding second or later, thereby restraining adverse effects (insufficiency in welding nugget diameter, and the like) caused due to the splitting of the welding current.

In the first aspect, the welding points may be placed at positions where a ratio of a distance between a central position of the first welding point and a central position of the welding point to a diameter of the first welding nugget or a diameter of the welding nugget is 0.5 to 2.5. Further, the welding points may be placed at positions where the ratio of the distance between the central positions of the first welding point and the welding point to the diameter of the first welding nugget or the welding nugget is 1.6 to 1.7.

When the ratio (the ratio of the distance between the central positions of the welding points to the welding nugget diameter) is set to 0.5 to 2.5, the joining strength of a welded portion (a welded portion constituted by the welding points close to each other) obtained by welding the metal plates with the target nugget diameter can be made sufficiently high regardless of the value of the target nugget diameter. Further, when the ratio is set to 1.6 to 1.7, the joining strength of the welded portion (the welded portion constituted by the welding points close to each other) obtained by welding the metal plates with the target nugget diameter can be made highest regardless of the value of the target nugget diameter.

In the first aspect, when the current application is performed between the electrodes, a current value of the current application may be gradually increased so as to be set to the first welding current value or the welding current value.

The resistance spot welding method of the first aspect may further include maintaining a sandwiched state where the metal plates are sandwiched between the electrodes for a predetermined time after a current value of the current application is returned to zero from the first welding current value or the welding current value, and then, releasing the sandwiched state.

In the first aspect, the welding points may include a second welding point and a third welding point. A distance between a central position of the first welding point and a central position of the second welding point, a distance between the central position of the first welding point and a central position of the third welding point, and a distance between the central position of the second welding point and the central position of the third welding point may be equal to each other.

In the first aspect, the welding points may include a second welding point and a third welding point. A distance between a central position of the first welding point and a central position of the third welding point may be different from a distance between a central position of the second welding point and the central position of the third welding point.

In the first aspect, the welding points may include a second welding point and a third welding point. A second welding current value to form a second welding nugget at the second welding point subjected to the resistance spot welding second may be different from a third welding current value to form a third welding nugget at the third welding point subjected to the resistance spot welding third.

In the disclosure, at the time when resistance spot welding is performed sequentially on a plurality of welding points close to each other on a plurality of metal plates put on top of one another, a welding current value to form a welding nugget at a welding point to be subjected to the resistance spot welding second or later among the welding points is set to be higher than a welding current value to form a welding nugget at a welding point to be subjected to the resistance spot welding first among the welding points. Hereby, it is possible to form a welding nugget with a target nugget diameter even if a welding current is split at the time when the welding nugget is formed at the welding point to be subjected to the resistance spot welding second or later, thereby restraining adverse effects (insufficiency in welding nugget diameter, and the like) caused due to the splitting of the welding current. As a result, it is possible to form the welding nuggets with the target nugget diameter in a close manner within a predetermined range only by the resistance spot welding. This makes it possible to increase the joining strength of a welded portion without causing upsizing of a welding device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the disclosure will be described below with reference to the drawings. The present embodiment deals with a case where the disclosure is applied as a resistance spot welding method for welding two plate materials made of aluminum.

Configuration of Spot Welding Device

Figure 1:
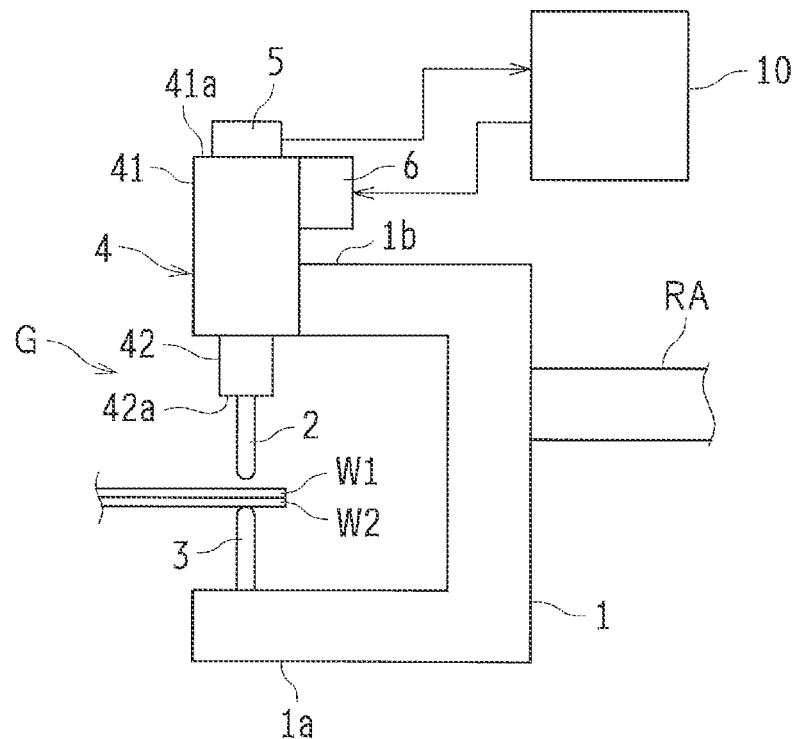
FIG. 1 is a schematic configuration diagram illustrating a spot-welding gun of a spot-welding device used in a resistance spot welding method according to an embodiment.
Figure 2:
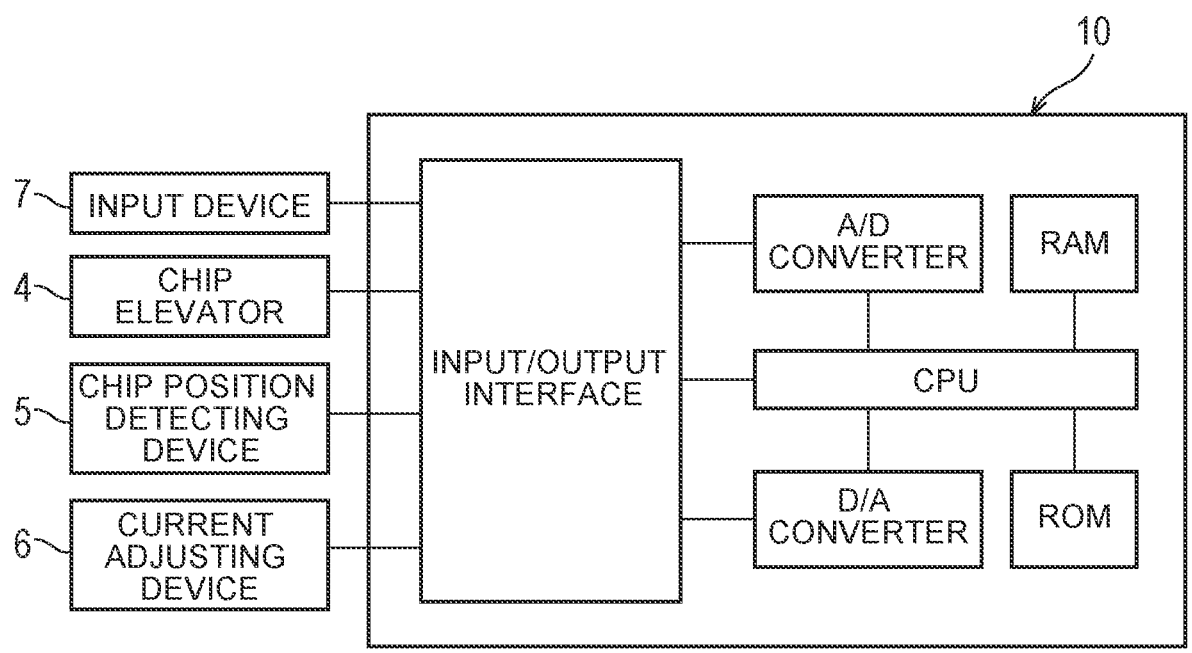
FIG. 2 is a view illustrating a schematic configuration of a control device of the spot-welding gun.
Figure 3:
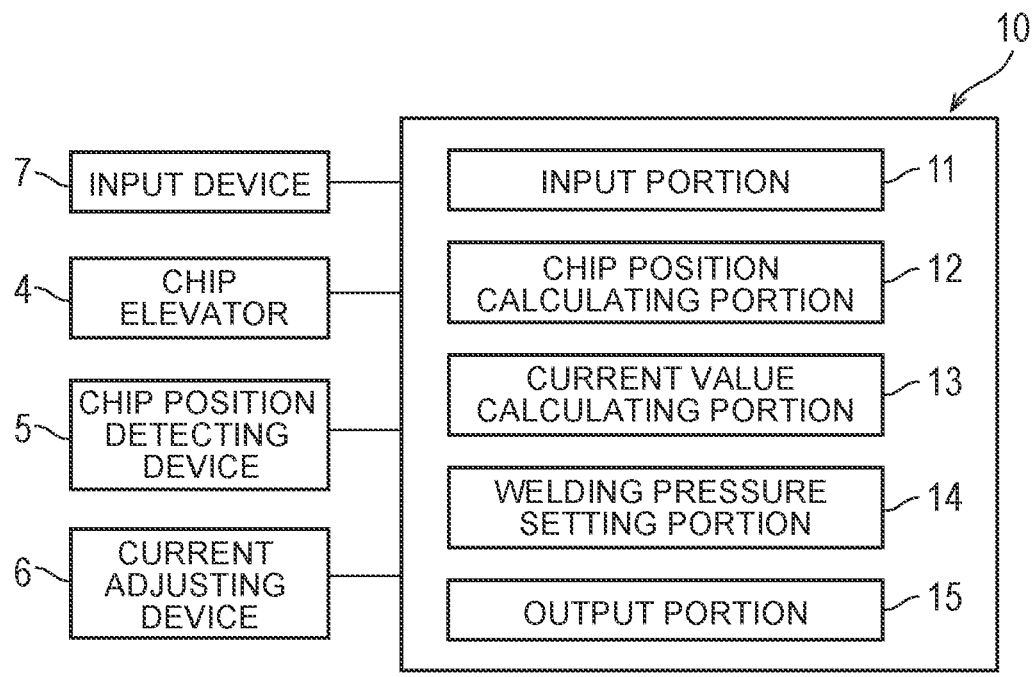
FIG. 3 is a functional block diagram illustrating an electrical configuration of the control device.

FIG. 1 is a schematic configuration diagram illustrating a spot-welding gun G of a spot-welding device used in the resistance spot welding method according to the present embodiment. Further, FIG. 2 is a view illustrating a schematic configuration of a control device 10 used for control of the spot-welding gun G. Further, FIG. 3 is a functional block diagram illustrating an electrical configuration of the control device 10.

The spot-welding gun G is constituted by the following main components: a gun body 1 held by a robot arm RA; an upper chip (upper electrode) 2; a lower chip (lower electrode) 3 attached to a lower part 1a of the gun body 1; an electrically-driven upper chip elevator (hereinafter just referred to as a chip elevator) 4 configured to hold the upper chip 2 so as to move the upper chip 2 up and down; a chip position detecting device 5; and a current adjusting device 6 configured to adjust a current value to flow between the upper chip 2 and the lower chip 3. Note that, in FIG. 1, W1, W2 indicate welded materials (plate materials made of aluminum).

As illustrated in FIG. 1, the gun body 1 is a member having a generally U-shape and the lower chip 3 is provided on the top surface of the lower part 1a in a standing manner. Further, the chip elevator 4 is attached to a distal end of an upper part 1b of the gun body 1.

The chip elevator 4 includes a servomotor 41 attached to the distal end of the upper part 1b of the gun body 1, and an elevating member 42 connected to a drive shaft (not shown) of the servomotor 41, and the upper chip 2 is attached to a bottom end 42a of the elevating member 42.

The chip position detecting device 5 is constituted by an encoder, for example, and is attached to an upper end 41a of the servomotor 41. A detection value of the chip position detecting device 5 is transmitted to the control device 10.

The current adjusting device 6 adjusts a current value to flow between the upper chip 2 and the lower chip 3 in accordance with a current command value transmitted from the control device 10. As the current adjusting device 6, a well-known device such as one including a variable resistor or one including a converter is employed, for example.

The control device 10 includes, as main portions, an input portion 11 configured to acquire information from an input device 7 via which plate thicknesses of the welded materials W1, W2, and the like are input, a chip position calculating portion 12 configured to calculate a chip position based on the detection value of the chip position detecting device 5, a current value calculating portion 13 configured to calculate a current value at the time when current application is performed between the upper chip 2 and the lower chip 3, a welding pressure setting portion 14 configured to set a welding pressure (welding pressures to the welded materials W1, W2 from the upper chip 2 and the lower chip 3) necessary for welding, and an output portion 15 configured to output information on the current value calculated by the current value calculating portion 13 and information on the welding pressure set by the welding pressure setting portion 14.

The control device 10 is realized such that programs corresponding to the above functions are stored in a ROM in a device including a CPU, the ROM, a RAM, an input/output interface, and the like as illustrated in FIG. 2. Further, information on the detection value from the chip position detecting device 5, the plate thicknesses, and so on is temporarily stored in the RAM. Note that other configurations of the control device 10 are the same as those used for the spot-welding gun G in the related art, and therefore, detailed descriptions thereof are omitted herein.

Spot Welding Method

Next will be described a spot welding method as a feature of the present embodiment.

In the spot welding method of the present embodiment, resistance spot welding is performed sequentially on a plurality of welding points close to each other on the welded materials W1, W2 put on top of one another. That is, the welding points close to each other are set within a predetermined region on the welded materials W1, W2, and the resistance spot welding is sequentially performed on the welding points. Hereby, a group of the welding points within the region is formed as one enlarged welded portion, so that the joining strength of the welded portion between the welded materials W1, W2 can be increased. Note that the present embodiment deals with a case where three welding points are set within the predetermined region and the resistance spot welding is sequentially performed on those welding points.

Figure 4A:
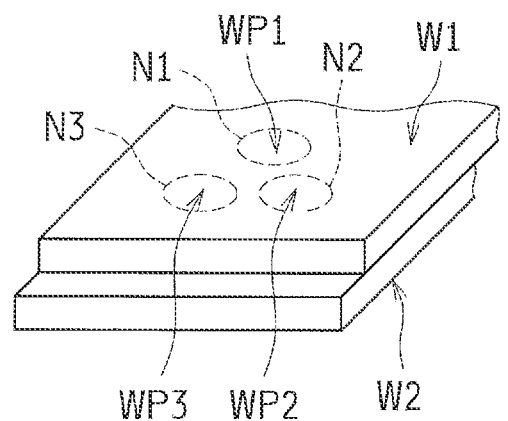
FIG. 4A is a perspective view illustrating a welded portion between welded materials and its vicinal area.
Figure 4B:
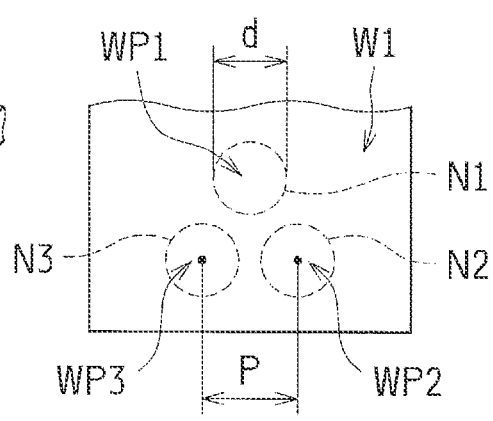
FIG. 4B is a plan view illustrating the welded portion between the welded materials and its vicinal area.

FIG. 4A is a perspective view illustrating the welded portion between the welded materials W1, W2 and its vicinal area, and FIG. 4B is a plan view illustrating the welded portion between the welded materials W1, W2 and its vicinal area. In those figures, outer edges of welding nuggets N1, N2, N3 formed at welding points WP1, WP2, WP3 are indicated by broken lines.

Further, the present embodiment deals with a case where, after spot welding is performed on the welding point (hereinafter referred to as a first welding point) WP1 on the upper side in the figure from among three welding points WP1, WP2, WP3 in FIG. 4B, spot welding is performed on the welding point (hereinafter referred to as a second welding point) WP2 on the right side in the figure, and then, spot welding is performed on the welding point (hereinafter referred to as a third welding point) WP3 on the left side in the figure.

The spot welding on the first welding point WP1, the second welding point WP2, and the third welding point WP3 are performed as follows. That is, in a state where the welded materials W1, W2 are sandwiched between the upper chip 2 and the lower chip 3 at a predetermined welding pressure (a welding pressure set by the welding pressure setting portion 14; e.g., 5 kN), a first current application is first performed at a current value calculated by the current value calculating portion 13, and then, the current application is stopped for only a predetermined time. After that, a second current application is performed at a current value (a current value different from the current value used in the first current application; a welding current value) newly calculated by the current value calculating portion 13, so that each of the welding nuggets N1, N2, N3 is formed. That is, after the welding nugget N1 (a first welding nugget) is formed by sequentially performing the first current application and the second current application in a state where the first welding point WP1 is sandwiched between the chips 2, 3, the welding nugget N2 (a second welding nugget) is formed by sequentially performing the first current application and the second current application in a state where the second welding point WP2 is sandwiched between the chips 2, 3, and after that, the welding nugget N3 (a third welding nugget) is formed by sequentially performing the first current application and the second current application in a state where the third welding point WP3 is sandwiched between the chips 2, 3.

The first current application is a preliminary current application in the disclosure and is intended to heat the welded materials W1, W2. This heating softens the welded materials W1, W2, and along with this, a gap between the welded materials W1, W2 can be almost eliminated. That is, by performing the preliminary current application on the first welding point WP1, the welded materials W1, W2 are softened at the first welding point WP1, so that a gap between the welded materials W1, W2 at this part can be almost eliminated. Further, by performing the preliminary current application on the second welding point WP2, the welded materials W1, W2 are softened at the second welding point WP2, so that a gap between the welded materials W1, W2 at this part can be almost eliminated. Furthermore, by performing the preliminary current application on the third welding point WP3, the welded materials W1, W2 are softened at the third welding point WP3, so that a gap between the welded materials W1, W2 at this part can be almost eliminated.

Further, the second current application is a current application to form the welding nuggets N1, N2, N3 at the welding points WP1, WP2, WP3, and the welded materials W1, W2 are melted at the welding points WP1, WP2, WP3 by the second current application, so that the welding nuggets N1, N2, N3 with a predetermined diameter (a target nugget diameter) are formed.

The following will describe the first current application and the second current application, more specifically.

First Current Application

The first current application is performed on each of the first welding point WP1, the second welding point WP2, and the third welding point WP3 at the same current value. As described earlier, the current value in the first current application is set so as to soften the welded materials W1, W2 by heating and to reduce the gap between the welded materials W1, W2. That is, the current value in the first current application is set to as high a value as possible within a range where the welded materials W1, W2 are not melted. This is a current value that reduces the gap between the welded materials W1, W2 and does not cause expulsion and surface flash without melting the welded materials W1, W2.

Whether the welded materials W1, W2 are melted or not depends on the material of the welded materials W1, W2, the plate thickness dimension of the welded materials W1, W2, and the number of welded materials to be put on top of one another. Accordingly, the current value in the first current application is set in advance based on experiments performed by changing the material of the welded materials W1, W2, the plate thickness dimension of the welded materials W1, W2, and the number of welded materials to be put on top of one another. Further, even at the same current value, whether the welded materials W1, W2 are melted or not also depends on a current application time. On this account, the current value in the first current application is also changed in accordance with the current application time. Information on current values in the first current application (information on the current values in the first current application in accordance with the material of the welded materials W1, W2, the plate thickness dimension of the welded materials W1, W2, the number of welded materials to be put on top of one another, and the current application time) is stored in advance in the ROM of the control device 10. From those pieces of information on the current values, information suitable for the welded materials W1, W2 to be actually subjected to spot welding is calculated (acquired) by the current value calculating portion 13, and a current command value of the first current application corresponding to the information is output to the current adjusting device 6 from the output portion 15.

In the present embodiment, the material of the welded materials W1, W2 is aluminum (aluminum alloy), the plate thickness dimension is 2.5 mm, and the number of welded materials to be put on top of one another is two. In this case, the current value in the first current application when the current application time of the first current application is 100 ms is set to about 10 kA, for example. This value is set to be higher as the melting point of the material of the welded materials W1, W2 is higher, the plate thickness dimension is larger, the number of welded materials to be put on top of one another is larger, and the current application time is shorter.

Second Current Application

The second current application is performed such that current values (a second welding current value, a third welding current value) for the second welding point WP2 and the third welding point WP3 are set to be higher than a current value (a first welding current value) for the first welding point WP1. As described earlier, the current values in the second current application are set so as to form, at the welding points WP1, WP2, WP3, the welding nuggets N1, N2, N3 with the target nugget diameter set in advance. That is, the current values in the second current application are set so as to form the welding nuggets N1, N2, N3 with the target nugget diameter by melting the welded materials W1, W2 at the welding points WP1, WP2, WP3.

First described is the current value in the second current application for the first welding point WP1.

At the time when the welding nugget N1 is formed at the first welding point WP1, any of the welding points WP1, WP2, WP3 is not welded, and therefore, splitting of the welding current does not occur. Accordingly, as the current value in the second current application for the first welding point WP1, it is not necessary to consider splitting of the welding current, and the current value is set to a value at which the welding nugget N1 with the target nugget diameter set in advance can be formed, within a range where expulsion and surface flash does not occur.

It is necessary to change the current value in the second current application for forming the welding nugget N1 with the target nugget diameter, based on the material of the welded materials W1, W2, the plate thickness dimension of the welded materials W1, W2, and the number of welded materials to be put on top of one another. In view of this, the current value in the second current application for the first welding point WP1 is set in advance based on experiments performed by changing the material of the welded materials W1, W2, the plate thickness dimension of the welded materials W1, W2, and the number of welded materials to be put on top of one another. Further, it is also necessary to change the current value in the second current application for forming the welding nugget N1 with the target nugget diameter, based on the current application time. On this account, the current value in the second current application for the first welding point WP1 is also changed in accordance with the current application time. Information on current values in the second current application for the first welding point WP1 (information on the current values in the second current application in accordance with the material of the welded materials W1, W2, the plate thickness dimension of the welded materials W1, W2, the number of welded materials to be put on top of one another, and the current application time) is stored in advance in the ROM of the control device 10. From those pieces of information on the current values, information suitable for the welded materials W1, W2 to be actually subjected to spot welding is calculated (acquired) by the current value calculating portion 13, and a current command value in the second current application corresponding to the information is output to the current adjusting device 6 from the output portion 15. Further, it is also necessary to change the current value in the second current application in accordance with the target nugget diameter. That is, the current value in the second current application is set to be higher as the target nugget diameter is larger.

In the present embodiment, as described earlier, the material of the welded materials W1, W2 is aluminum, the plate thickness dimension is 2.5 mm, and the number of welded materials to be put on top of one another is two. In this case, when the target nugget diameter is 6.0 mm and the current application time in the second current application for the first welding point WP1 is 200 ms, the current value in the second current application is set to about 30 kA, for example. This value is set to be higher as the melting point of the material of the welded materials W1, W2 is higher, the plate thickness dimension is larger, the number of welded materials to be put on top of one another is larger, the target nugget diameter is larger, and the current application time is shorter.

Hereby, the welding nugget N1 with the target nugget diameter is formed at the first welding point WP1.

Next will be described the current values in the second current application for the second welding point WP2 and the third welding point WP3.

At the time when the welding nuggets N2, N3 are formed at the welding points WP2, WP3, the welding nugget N1 has been already formed at the first welding point WP1, and therefore, the welding current is highly likely to be split. On this account, in consideration of the splitting of the welding current, the current values in the second current application for the welding points WP2, WP3 are set to be higher than the current value in the second current application for the first welding point WP1 within a range where expulsion and surface flash does not occur, so that the welding nuggets N2, N3 with the target nugget diameter can be formed even if the welding current is split. More specifically, the current values in the second current application for the welding points WP2, WP3 are set to values higher, by about 10% to 50%, than the current value in the second current application for the first welding point WP1.

In this case, it is also necessary to change the current values in the second current application for forming the welding nuggets N2, N3 with the target nugget diameter, based on the material of the welded materials W1, W2, the plate thickness dimension of the welded materials W1, W2, and the number of welded materials to be put on top of one another. In view of this, the current values in the second current application for the welding points WP2, WP3 are set in advance based on experiments performed by changing the material of the welded materials W1, W2, the plate thickness dimension of the welded materials W1, W2, and the number of welded materials to be put on top of one another. Further, it is also necessary to change the current values in the second current application for forming the welding nuggets N2, N3 with the target nugget diameter, based on the current application time. On this account, the current values in the second current application for the welding points WP2, WP3 are also changed in accordance with the current application time.

Furthermore, as distances between the welding points WP1, WP2, WP3 (welding-nugget-to-welding-nugget pitch dimensions) are shorter, the welding current is highly likely to be split, and its splitting ratio easily becomes large. On this account, as the distances between the welding points WP1, WP2, WP3 are shorter, the current values in the second current application for the welding points WP2, WP3 are set to be higher.

Information on current values in the second current application for the welding points WP2, WP3 (information on the current values in the second current application in accordance with the material of the welded materials W1, W2, the plate thickness dimension of the welded materials W1, W2, the number of welded materials to be put on top of one another, the current application time, and the welding-nugget-to-welding-nugget pitch dimensions) is stored in advance in the ROM of the control device 10. From those pieces of information on the current values, information suitable for the welded materials W1, W2 to be actually subjected to spot welding is calculated (acquired) by the current value calculating portion 13, and a current command value in the second current application corresponding to the information is output to the current adjusting device 6 from the output portion 15. Further, in this case, it is also necessary to change the current value in the second current application in accordance with the target nugget diameter. That is, the current value in the second current application is set to be higher as the target nugget diameter is larger.

In the present embodiment, as described earlier, the material of the welded materials W1, W2 is aluminum, the plate thickness dimension is 2.5 mm, and the number of welded materials to be put on top of one another is two. In this case, when the target nugget diameter is 6.0 mm and the welding-nugget-to-welding-nugget pitch dimension is 10 mm, and the current application time in the second current application for each of the second welding point WP2 and the third welding point WP3 is 200 ms, the current value in the second current application is set to about 35 kA, for example. This value is set to be higher as the melting point of the material of the welded materials W1, W2 is higher, the plate thickness dimension is larger, the number of welded materials to be put on top of one another is larger, the target nugget diameter is larger, the welding-nugget-to-welding-nugget pitch dimension is smaller, and the current application time is shorter.

Hereby, the welding nuggets N2, N3 with the target nugget diameter are formed at the welding points WP2, WP3.

Transition of Current Value in Spot Welding

Figure 5A:
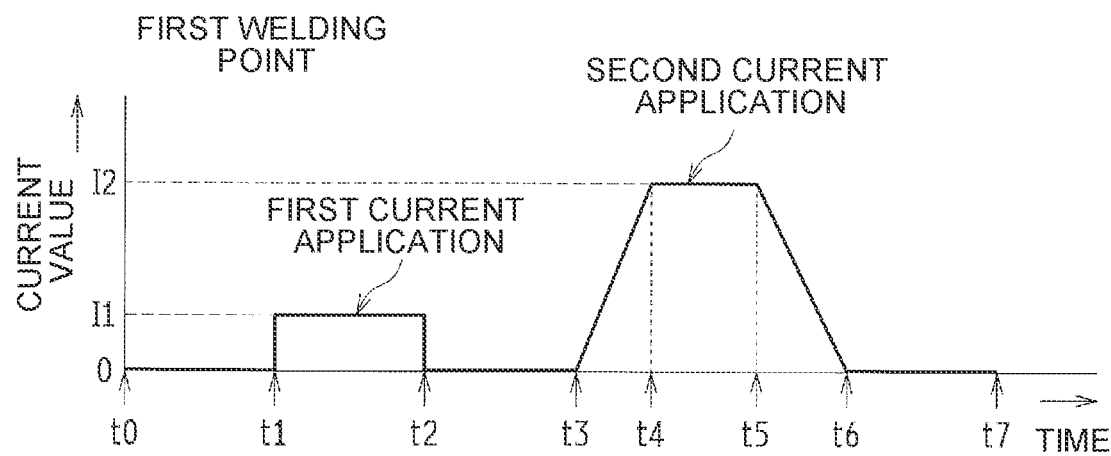
FIG. 5A is a view illustrating an example of transition of a current value in resistance spot welding to a first welding point.
Figure 5B:
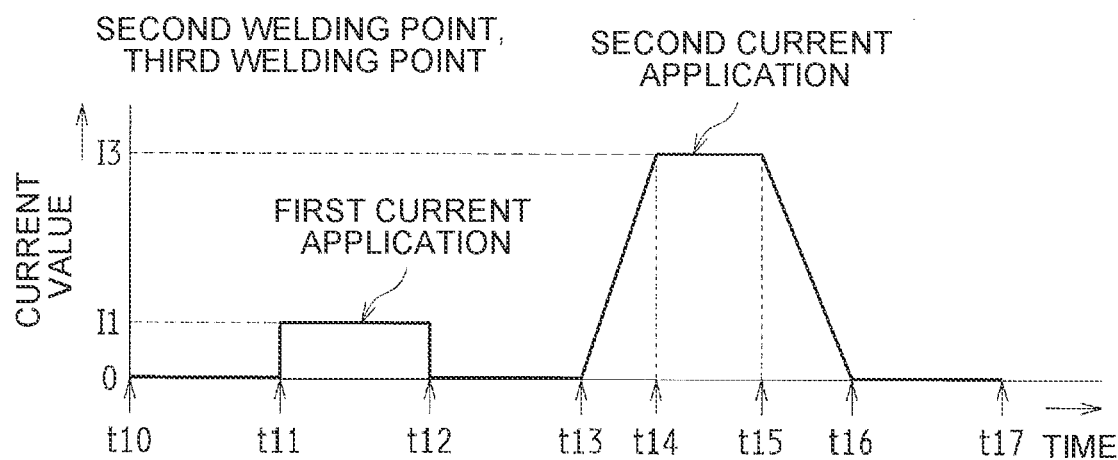
FIG. 5B is a view illustrating an example of transition of a current value in resistance spot welding to a second welding point and a third welding point.

FIG. 5A illustrates an example of transition of a current value in resistance spot welding to the first welding point WP1, and FIG. 5B illustrates an example of transition of a current value in resistance spot welding to the second welding point WP2 and the third welding point WP3.

First described is the transition of a current value in resistance spot welding to the first welding point WP1.

As illustrated in FIG. 5A, at the time of resistance spot welding to the first welding point WP1, the first welding point WP1 of the welded materials W1, W2 is sandwiched between the upper chip 2 and the lower chip 3 of the spot-welding gun G at a predetermined welding pressure. The timing when the first welding point WP1 has been sandwiched is timing t0 in FIG. 5A. The sandwiched state is maintained for only a predetermined time (timing t0 to timing t1).

After that, the first current application is started at a current value I1 (10 kA in the present embodiment), and the first current application is continued for only a predetermined time (timing t1 to timing t2). The first current application is started at timing t1 in the figure (the current value is changed from 0 to I1) without gradually changing the current value during the current application time of the first current application, and the first current application is finished at timing t2 in the figure (the current value is changed from I1 to 0).

After the first current application is finished, the current application is stopped only during a cooldown time (timing t2 to timing t3) during which the first welding point WP1 and its peripheral portion are cooled down in the sandwiched state.

After that, the second current application is started, and the second current application is continued for only a predetermined time (timing t3 to timing t6).

During the current application time of the second current application, when the current application as the second current application is started, the current value is gradually increased for a predetermined time (timing t3 to timing t4). At the time when the current value reaches a predetermined current value I2 (30 kA in the present embodiment) for the second current application, the current value I2 is maintained for only a predetermined time (timing t4 to timing t5). After that, the current value is gradually decreased for a predetermined time (timing t5 to timing t6), so that the current value is returned to zero (timing t6). The gradual increase of the current value from timing t3 to timing t4 restrains occurrence of expulsion and surface flash that easily occurs when the current value is rapidly increased. Further, in the present embodiment, when a time (timing t3 to timing t4) during which the current value is gradually increased, a time (timing t4 to timing t5) during which the current value I2 for the second current application is maintained, and a time (timing t5 to timing t6) during which the current value is gradually decreased are compared with each other, the time during which the current value I2 for the second current application is maintained is longest and the time during which the current value is gradually increased is shortest.

After the current value is returned to zero, the state where the first welding point WP1 of the welded materials W1, W2 is sandwiched between the upper chip 2 and the lower chip 3 is maintained for only a predetermined time (timing t6 to timing t7), and after that, this sandwiched state is released (timing t7). By sandwiching the welded materials W1, W2 between the chips 2, 3 for only the predetermined time after the current value is returned to zero, it is possible to restrain occurrence of a blow-hole in the welding nugget N1.

In the present embodiment, a time (timing t0 to timing t1) during which the sandwiched state is maintained before the first current application is started, a time (timing t1 to timing t2) during which the first current application is continued, the cooldown time (timing t2 to timing t3), and a time (timing t6 to timing t7) during which the sandwiched state is maintained after the second current application is finished are set to the same period of time. Further, a time (timing t3 to timing t6) during which the second current application is performed is set to be longer than those times.

Due to the resistance spot welding to the first welding point WP1, the welding nugget N1 with the target nugget diameter is formed at the first welding point WP1.

Next will be described transition of a current value in resistance spot welding to the second welding point WP2.

As illustrated in FIG. 5B, at the time of resistance spot welding to the second welding point WP2, the second welding point WP2 of the welded materials W1, W2 is sandwiched between the upper chip 2 and the lower chip 3 of the spot-welding gun G at a predetermined welding pressure. The timing when the second welding point WP2 has been sandwiched is timing t10 in FIG. 5B. The sandwiched state is maintained for only a predetermined time (timing t10 to timing t11).

After that, the first current application is started at a current value I1 (10 kA in the present embodiment), and the first current application is continued for only a predetermined time (timing t11 to timing t12). In this case, the current value is not gradually changed during the current application time of the first current application.

After the first current application is finished, the current application is stopped only during a cooldown time (timing t12 to timing t13) during which the second welding point WP2 and its peripheral portion are cooled down in the sandwiched state.

After that, the second current application is started, and the second current application is continued for only a predetermined time (timing t13 to timing t16).

During the current application time of the second current application, when the current application as the second current application is started, the current value is gradually increased for a predetermined time (timing t13 to timing t14). At the time when the current value reaches a predetermined current value I3 (35 kA in the present embodiment) for the second current application, the current value I3 is maintained for only a predetermined time (timing t14 to timing t15). After that, the current value is gradually decreased for a predetermined time (timing t15 to timing t16), so that the current value is returned to zero (timing t16). In this case, the gradual increase of the current value from timing t13 to timing t14 restrains occurrence of expulsion and surface flash that easily occurs when the current value is rapidly increased. Further, when a time (timing t13 to timing t14) during which the current value is gradually increased, a time (timing t14 to timing t15) during which the current value I3 for the second current application is maintained, and a time (timing t15 to timing t16) during which the current value is gradually decreased are compared with each other, the time during which the current value I3 for the second current application is maintained is longest and the time during which the current value is gradually increased is shortest.

After the current value is returned to zero, the state where the second welding point WP2 of the welded materials W1, W2 is sandwiched between the upper chip 2 and the lower chip 3 is maintained for only a predetermined time (timing t16 to timing t17), and after that, this sandwiched state is released (timing t17). By sandwiching the welded materials W1, W2 between the chips 2, 3 for only the predetermined time after the current value is returned to zero, it is possible to restrain occurrence of a blow-hole in the welding nugget N2.

Also in this case, a time (timing t10 to timing t11) during which the sandwiched state is maintained before the first current application is started, a time (timing t11 to timing t12) during which the first current application is continued, the cooldown time (timing t12 to timing t13), and a time (timing t16 to timing t17) during which the sandwiched state is maintained after the second current application is finished are set to the same period of time. Further, a time (timing t13 to timing t16) during which the second current application is continued is set to be longer than those times. In the present embodiment, respective times (timing t13 to timing t14, timing t14 to timing t15, and timing t15 to timing t16) in the second current application in the resistance spot welding to the second welding point WP2 are the same as respective times (timing t3 to timing t4, timing t4 to timing t5, and timing t5 to timing t6) in the second current application in the resistance spot welding to the first welding point WP1.

Due to the resistance spot welding to the second welding point WP2, the welding nugget N2 with the target nugget diameter is formed at the second welding point WP2.

Further, in the resistance spot welding to the third welding point WP3, the welding nugget N3 with the target nugget diameter is formed at the third welding point WP3 by the same transition of the current value as that of the resistance spot welding to the second welding point WP2.

Effects of Embodiment

As described above, in the present embodiment, it is possible to form a plurality of (three in the present embodiment) welding nuggets N1, N2, N3 with a target nugget diameter in a close manner within a predetermined range only by resistance spot welding. This makes it possible to increase the joining strength of a welded portion without causing upsizing of a welding device. For example, in a case where the spot welding method is applied to joining between vehicle body panels of an automobile, welded portions provided intermittently along an alignment part between the vehicle body panels can be each formed as a welding-point group, thereby making it possible to increase rigidity of a vehicle body and to improve load absorption performance at the time of a vehicle collision.

Further, the welded portion is formed as a welding-point group, so that the joining strength of the welded portion is high. Accordingly, in a case where the welded materials W1, W2 are joined via a plurality of welded portions, a high joining strength between the welded materials W1, W2 can be maintained while an interval dimension between welded portions adjacent to each other is made large. That is, the interval dimension between the welded portions adjacent to each other can be made larger in comparison with spot welding used in the related art. On this account, even in a case of the welded materials W1, W2 in which a flat portion usable as the welded portion is small, it is possible to secure a high joining strength between the welded materials W1, W2.

Further, as described above, in the present embodiment, the first current application (a preliminary current application) is performed on the welding points WP1, WP2, WP3 prior to the second current application (a current application to form the welding nuggets N1, N2, N3), and therefore, the welded materials W1, W2 are heated, so that the welded materials W1, W2 are softened, thereby making it possible to almost eliminate the gap between the welded materials W1, W2. As a result, it is possible to restrain expulsion and surface flash that easily occurs at the time when spot welding is performed in a state where a contact area between the welded materials W1, W2 is small, thereby making it possible to increase reliability to appropriately form the welding nuggets N1, N2, N3 with the target nugget diameter.

Further, since only the resistance spot welding is used, problems to be caused when laser spot welding, self-piercing riveting (SPR), and flow drill screw (FDS) are used are not caused. That is, it is possible to prevent defects such as a decrease in throat depth, cracking, and perforation of a melt zone that are caused along with occurrence of spattering when laser spot welding is used. Further, it is possible to avoid defects such as an increase in running cost and an increase in cycle time that are caused when SPR and FDS are used.

Joining Strength Test Result

Next will be described a result of a joining strength test performed to check the effects described above. The joining strength test was performed such that a load in a shear direction was applied to a welded portion of each of the welded materials W1, W2 joined by the resistance spot welding method of the above embodiment and welded materials joined by a resistance spot welding method in the related art, and a stroke in the shear direction before the welded portion broke was measured. Note that, as the welded materials joined by the resistance spot welding method in the related art as used herein, only one welding point is provided, and a welding nugget with a predetermined welding nugget diameter (generally corresponding to a welding nugget diameter of one welding nugget in the above embodiment) is formed at this welding point.

Figure 6:
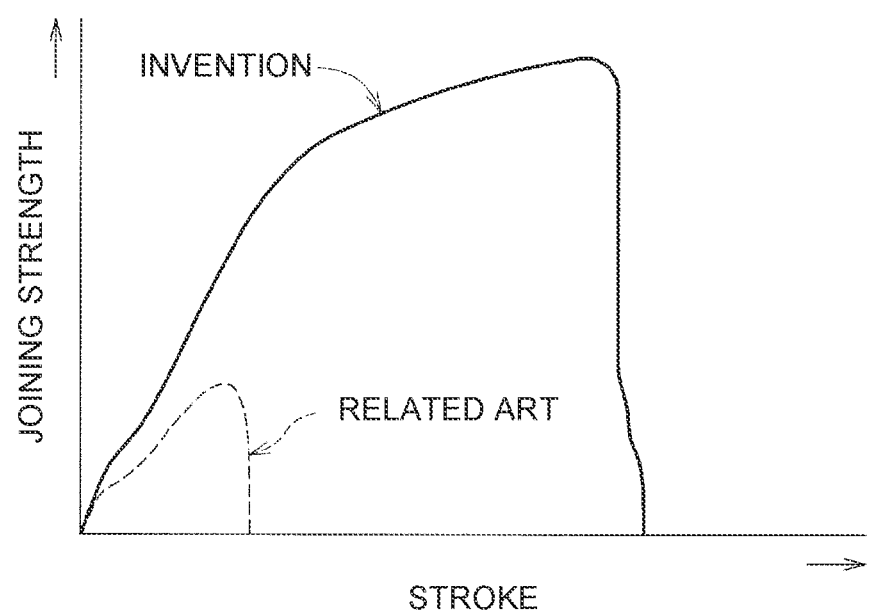
FIG. 6 is a view illustrating a result of a joining strength test.

FIG. 6 is a view illustrating the result of the joining strength test, and a continuous line in the figure indicates a relationship between the stroke and the joining strength in the welded materials W1, W2 joined by the resistance spot welding method of the above embodiment. Further, a broken line in the figure indicates a relationship between the stroke and the joining strength in the welded materials joined by the resistance spot welding method in the related art.

As is apparent from FIG. 6, it could be confirmed that the welded materials W1, W2 in the above embodiment had a largely increased joining strength in comparison with the welded materials in the related art (in this joining strength test, the joining strength in the above embodiment was around three times higher than that in the related art).

Optimum Placement of Welding Nugget

Next will be described a preferable placement of the welding nuggets N1, N2, N3.

As the placement of the welding nuggets N1, N2, N3, the following cases are considered: a case where a welding-nugget-to-welding-nugget pitch dimension (distances between central positions of the welding points WP1, WP2, WP3; a dimension P in FIG. 4B) is defined; and a welding-nugget-to-welding-nugget pitch ratio P/d that is a ratio of the welding-nugget-to-welding-nugget pitch dimension P to a welding nugget diameter (a dimension d in FIG. 4B) is defined.

Figure 7A:
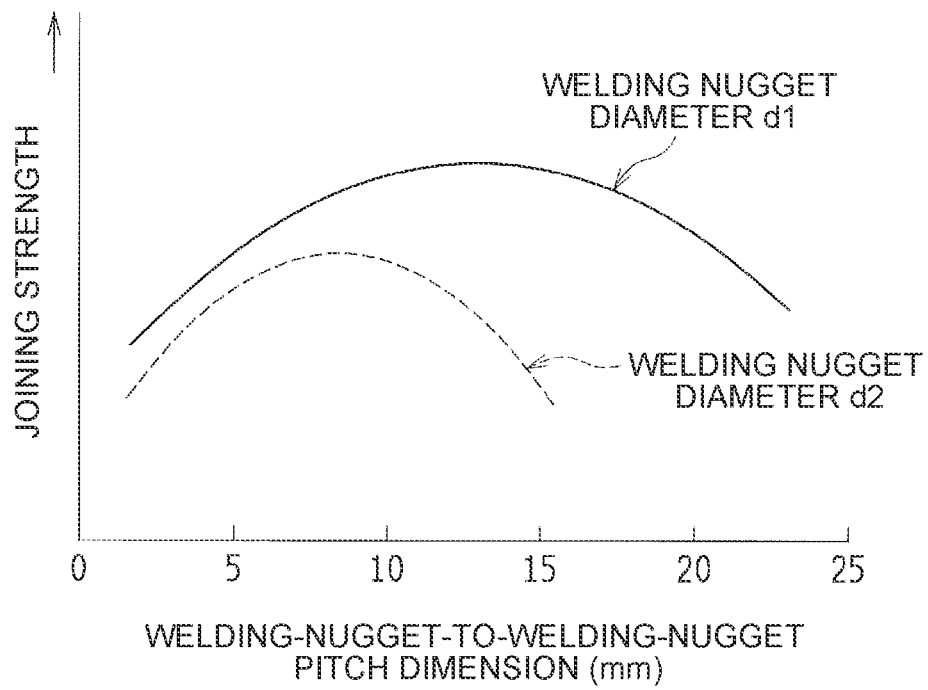
FIG. 7A is a view illustrating an experimental result of measurement of a relationship between a welding-nugget-to-welding-nugget pitch dimension and joining strength when the welding-nugget-to-welding-nugget pitch dimension is changed.
Figure 7B:
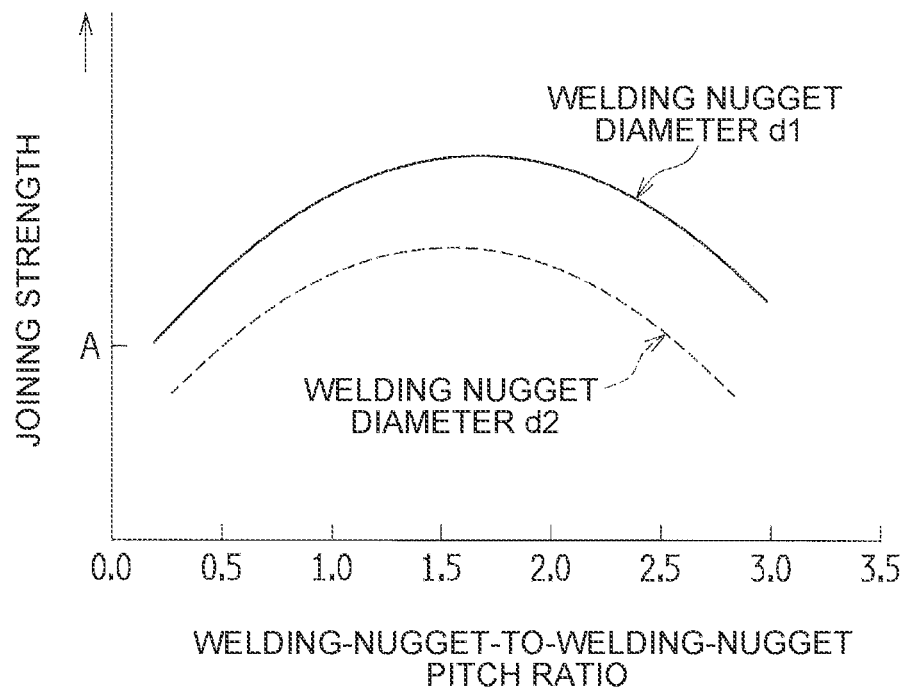
FIG. 7B is a view illustrating an experimental result of measurement of a relationship between a welding-nugget-to-welding-nugget pitch ratio and joining strength when the welding-nugget-to-welding-nugget pitch ratio is changed.

FIG. 7A is a view illustrating an experimental result of measurement of a relationship between the welding-nugget-to-welding-nugget pitch dimension P and the joining strength of a joining portion when the welding-nugget-to-welding-nugget pitch dimension P is changed, and FIG. 7B is a view illustrating an experimental result of measurement of a relationship between the welding-nugget-to-welding-nugget pitch ratio P/d and the joining strength of a joining portion when the welding-nugget-to-welding-nugget pitch ratio P/d is changed. In those figures, a continuous line indicates a case where the welding nugget diameter is set to be relatively large (a case where the welding nugget diameter is d1; e.g., 8.0 mm), and a broken line indicates a case where the welding nugget diameter is set to be relatively small (a case where the welding nugget diameter is d2; e.g., 5.0 mm).

As illustrated in FIG. 7A, in a case where the welding-nugget-to-welding-nugget pitch dimension P is changed, when the welding nugget diameter is changed, a value of the welding-nugget-to-welding-nugget pitch dimension P at which the joining strength is highest is also changed. More specifically, in a case where the welding nugget diameter is d1, the welding-nugget-to-welding-nugget pitch dimension at which the joining strength is highest is about 13 mm, and in a case where the welding nugget diameter is d2, the welding-nugget-to-welding-nugget pitch dimension at which the joining strength is highest is about 8 mm.

On the other hand, as illustrated in FIG. 7B, in a case where the welding-nugget-to-welding-nugget pitch ratio P/d is changed, even if the welding nugget diameter is changed, the welding-nugget-to-welding-nugget pitch ratio P/d at which the joining strength is highest has generally the same value. That is, in either of the case where the welding nugget diameter is d1 and the case where the welding nugget diameter is d2, the welding-nugget-to-welding-nugget pitch ratio at which the joining strength is highest is about 1.6.

On this account, as a preferable placement of the welding nuggets N1, N2, N3, it is effective to place the welding nuggets N1, N2, N3 based on the welding-nugget-to-welding-nugget pitch ratio P/d, because a high joining strength can be obtained without considering the welding nugget diameter.

For example, in a case where a joining strength of A or more in FIG. 7B is required as the joining strength, the welding-nugget-to-welding-nugget pitch ratio P/d should be set to a range from 0.5 to 2.5. Further, in order to achieve the highest joining strength, the welding-nugget-to-welding-nugget pitch ratio P/d should be set to a range from 1.6 to 1.7.

Based on the foregoing, in the above embodiment, the welding-nugget-to-welding-nugget pitch ratio P/d is preferably set to 0.5 to 2.5, more preferably 1.6 to 1.7.

Modification 1

Next will be described Modification 1. The present modification is different from the above embodiment in the number of welding points. Other configurations and a welding method of the present modification are similar to those in the above embodiment.

Figure 8A:
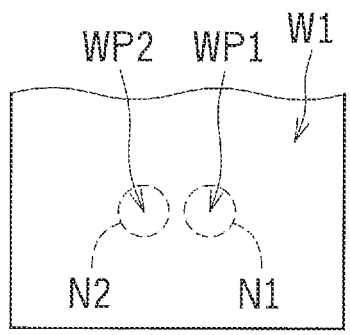
FIG. 8A is a view corresponding to FIG. 4B, in Modification 1 in which two welding points are provided.

FIG. 8A is a view corresponding to FIG. 4B, in a case where two welding points WP1, WP2 are provided.

Even in this case, in the second current application, a current value to the second welding point WP2 is set to be higher than a current value to the first welding point WP1.

Modification 2

Next will be described Modification 2. The present modification is also different from the above embodiment in the number of welding points. Other configurations and a welding method of the present modification are similar to those in the above embodiment.

Figure 8B:
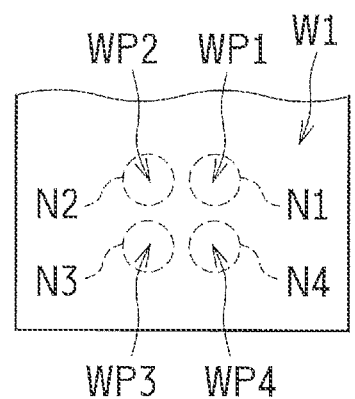
FIG. 8B is a view corresponding to FIG. 4B, in Modification 2 in which four welding points are provided.

FIG. 8B is a view corresponding to FIG. 4B, in a case where four welding points WP1, WP2, WP3, WP4 are provided.

Even in this case, in the second current application, current values to the second welding point WP2, the third welding point WP3, and a fourth welding point WP4 are set to be higher than a current value to the first welding point WP1.

Modification 3

Figure 9A:
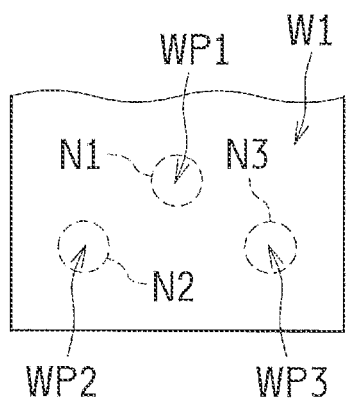
FIG. 9A is a view corresponding to FIG. 4B, in Modification 3 in which three welding points are provided.
Figure 9B:
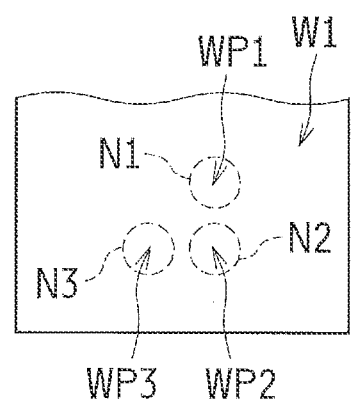
FIG. 9B is a view corresponding to FIG. 4B, in Modification 3 in which three welding points are provided.

Next will be described Modification 3. The present modification deals with a case where the number of welding points is three similarly to the above embodiment and the welding points WP1, WP2, WP3 are provided at unequal intervals. Examples of such a placement are placements of the welding points WP1, WP2, WP3 as illustrated in FIGS. 9A and 9B.

In this case, resistance spot welding to the welding points WP1, WP2, WP3 is performed preferably in the following order. That is, welding is first performed on the welding points WP1, WP2 provided at positions between which the welding-nugget-to-welding-nugget pitch dimension is short, and welding is finally performed on the welding point WP3 provided at a position with a long welding-nugget-to-welding-nugget pitch dimension from the welding points WP1, WP2. That is, in FIG. 9A, the welding-nugget-to-welding-nugget pitch dimension between the second welding point WP2 and the third welding point WP3 is long, and therefore, welding is performed sequentially on the first welding point WP1 and the second welding point WP2, and after that, welding is finally performed on the third welding point WP3. This also applies to FIG. 9B. This is to prevent splitting of the welding current as much as possible by placing the welding point (the third welding point WP3) finally subjected to welding at a position distanced from the other welding points, thereby reducing necessary current values in the second current application to weld the welding points WP1, WP2, WP3 and achieving a reduction in power consumption.

Other Embodiments

Note that the present disclosure is not limited to the embodiment and the modifications but can include all modifications and applications made within Claims and a range equivalent to Claims.

For example, the above embodiment and the modifications deal with a case where the disclosure is applied as a resistance spot welding method for welding two plate materials made of aluminum. However, the disclosure is not limited to this, and is also applicable as a resistance spot welding method for welding three or more plate materials. Further, a material of a plate material to which the resistance spot welding method of the disclosure is applicable is not limited to aluminum, but may be iron, magnesium, titanium, copper, and the like. Further, the disclosure is also applicable to metals of different types.

Further, in the embodiment and the modifications, the first current application is performed prior to the second current application. However, the disclosure is not limited to this, and a current application (corresponding to the second current application in the embodiment and the modifications) to form a welding nugget may be performed without performing the first current application. Such a welding method can be particularly applied to a welded material (e.g., steel sheet) made of a material in which expulsion and surface flash hardly occurs.

Further, in the above embodiment and the modifications, the same value is employed as the second current values in resistance spot welding to be performed after the resistance spot welding to the second welding point WP2. However, the disclosure is not limited to this, and different second current values may be set so as to form respective welding nuggets with the target nugget diameter.

The disclosure is applicable to a resistance spot welding method for welding plate materials made of aluminum.

What is claimed is:

1. A resistance spot welding method comprising:
    sandwiching a plurality of metal plates put on top of one another between a pair of electrodes and performing resistance spot welding sequentially on a plurality of welding points close to each other on the plurality of metal plates by performing a current application between the pair of electrodes, so as to join the plurality of metal plates to each other, wherein the plurality of welding points include a first welding point and a second welding point, and wherein a second welding current value to form a second welding nugget at the second welding point to which the resistance spot welding is applied at a second point time, is set to be higher than a first welding current value to form a first welding nugget at the first welding point to which the resistance spot welding is applied at a first point in time preceding the second point in time; and
    performing a preliminary current application on the plurality of welding points prior to applying the first welding current value and the second welding current value to form the first welding nugget and the second welding nugget, wherein a preliminary current value in the preliminary current application is lower than the first welding current value and the second welding current value, and the same preliminary current value is set for each of the plurality of welding points in the preliminary current application,
    wherein, when the current application is performed to apply a third current value between the pair of electrodes, the third current value is gradually increased until the third current value reaches the first welding current value or the second welding current value.

2. The resistance spot welding method according to claim 1, wherein the second welding current value is set higher by 10% to 50% than the first welding current value.

3. The resistance spot welding method according to claim 1, wherein, as a distance between the first and the second welding points is shorter, a ratio of the second welding current value to the first welding current value is set higher.

4. The resistance spot welding method according to claim 1, wherein the first and the second welding points are placed at positions where a ratio of a distance between a central position of the first welding point and a central position of the second welding point to a diameter of the first welding nugget or a diameter of the second welding nugget is 0.5 to 2.5.

5. The resistance spot welding method according to claim 4, wherein the ratio of the distance between the central positions of the first welding point and the second welding point to the diameter of the first welding nugget or the second welding nugget is 1.6 to 1.7.

6. The resistance spot welding method according to claim 1, further comprising maintaining a sandwiched state where the plurality of metal plates are sandwiched between the pair of electrodes for a predetermined time after the third current value that is applied to the pair of electrodes is returned to zero from the first welding current value or the second welding current value, and
    after the predetermined time, releasing the sandwiched state.

7. The resistance spot welding method according to claim 1, wherein:
    the plurality of welding points include a third welding point and a fourth welding point; and
    a distance between a central position of the first welding point and a central position of the third welding point, a distance between the central position of the first welding point and a central position of the fourth welding point, and a distance between the central position of the third welding point and the central position of the fourth welding point are equal to each other.

8. The resistance spot welding method according to claim 1, wherein:
    the plurality of welding points include a third welding point and a fourth welding point; and
    a distance between a central position of the first welding point and a central position of the fourth welding point is different from a distance between a central position of the third welding point and the central position of the fourth welding point.

9. The resistance spot welding method according to claim 1, wherein:
    the plurality of welding points further include a third welding point and a fourth welding point; and
    a third welding current value to form a third welding nugget at the third welding point to which the resistance spot welding is applied at a third point in time, is different from a fourth welding current value to form a fourth welding nugget at the fourth welding point to which the resistance spot welding is applied at a fourth in time, which is subsequent to the third point in time.

10. The resistance spot welding method according to claim 1, wherein:
    the third current value is gradually increased from zero.

* * * * *